(12) United States Patent
Bunker et al.

(10) Patent No.: US 6,732,582 B2
(45) Date of Patent: May 11, 2004

(54) METHOD FOR QUANTIFYING FILM HOLE FLOW RATES FOR FILM-COOLED PARTS

(75) Inventors: Ronald Scott Bunker, Niskayuna, NY (US); Nirm Velumylum Nirmalan, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/064,855

(22) Filed: Aug. 23, 2002

(65) Prior Publication Data

US 2004/0037344 A1 Feb. 26, 2004

(51) Int. Cl.⁷ .................. G01K 17/10; G01N 25/72
(52) U.S. Cl. ................. 73/204.21; 250/341.6; 374/45
(58) Field of Search ............. 374/4, 5, 45, 54; 73/204.21, 1.59; 250/341.6, 340; 702/45, 49, 100, 134–136

(56) References Cited

U.S. PATENT DOCUMENTS

| | | | | |
|---|---|---|---|---|
| 4,644,162 A | | 2/1987 | Bantel et al. ................ 250/340 |
| 4,777,368 A | * | 10/1988 | Kerlin, Jr. ................ 250/341.6 |
| 5,111,046 A | | 5/1992 | Bantel ........................ 250/330 |
| 6,422,743 B1 | * | 7/2002 | Nirmalan et al. ............. 374/43 |
| 6,585,408 B2 | * | 7/2003 | El-Gabry et al. ............. 374/43 |

FOREIGN PATENT DOCUMENTS

JP          01201165 A    *   8/1989   ............. 374/45

* cited by examiner

Primary Examiner—Diego Gutierrez
Assistant Examiner—Stanley J. Pruchnic, Jr.
(74) Attorney, Agent, or Firm—Cantor Colburn LLP

(57) ABSTRACT

To measure the flow rate of coolant through a cooling hole of a film-cooled part, a transient thermal response of an external surface temperature of the film-cooled part is measured and the transient thermal response is characterized mathematically. From the mathematical characterization, the flow rate through the film hole is determined.

16 Claims, 5 Drawing Sheets

4D Spacing

METHOD FOR QUANTIFYING FILM HOLE FLOW RATES FOR FILM-COOLED PARTS

FEDERAL RESEARCH STATEMENT

This invention was made with Government support under contract F33615-98-C-2893 awarded by the Department of Defense. The Government has certain rights in this invention.

BACKGROUND

This patent specification relates to a method for quantifying film hole flow rates for film-cooled parts.

Gas turbines and other high-temperature equipment use film cooling extensively for effective protection of the hot gas path components, such as turbine blades. Film cooling refers to a technique for cooling a part in which cool air is discharged through a plurality of small holes in the external walls of the part to provide a thin, cool barrier along the external surface of the part and prevent or reduce direct contact with hot gasses.

Accurate knowledge of the film hole flow rates is required to determine how each part should behave compared to the design intent. Inspection of parts to measure these flow rates determines the acceptability of the parts for use, and hence, also has a large impact on cost and rework. Such inspection or measurement can be used to help determine the life or remaining life of a part. Inspection of serviced parts determines their ability to be returned to service.

The standard method for the measurement of film hole flow rates is known as "flow checks". A flow check measures the total flow through a part placed on a test stand. Blockage of various film holes or rows of holes provides measurements for the remaining holes. This process is repeated with various holes blocked until all desired measurements have been made. Comparisons to either gauge measurements on good parts and/or analytic models of the flow circuits determines the acceptability. Typically, this process is so time consuming that only overall parts are flow checked, or at best some individual film rows, but never individual film holes. Furthermore, there is no way to distinguish between two parts which may have very different internal thermal performance (heat transfer coefficients), but which flow the same amount and otherwise pass all external dimensional tests.

SUMMARY

The above-mentioned disadvantages or drawbacks of the prior art are overcome or alleviated by a method for measuring a flow rate in a cooling hole of a film cooled part comprising measuring a transient thermal response of an external surface temperature of the film cooled part, mathematically characterizing said transient thermal response; and determining the flow rate from the characterization.

DETAILED DESCRIPTION

Figure 1:
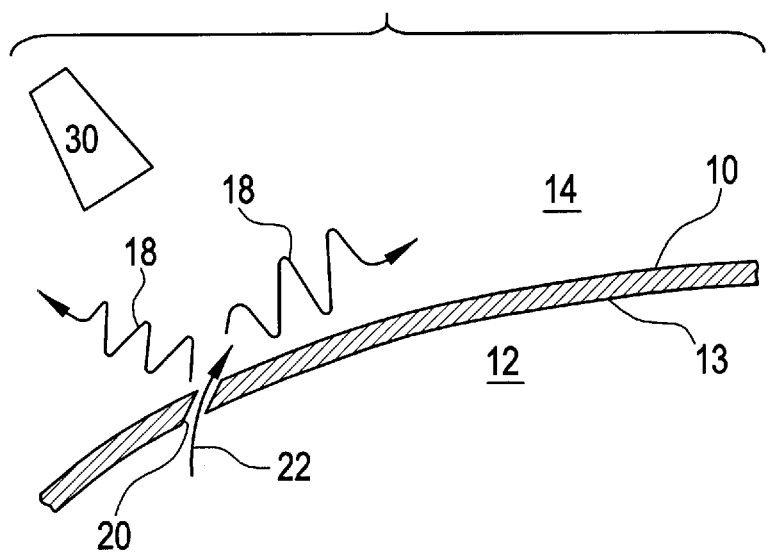
FIG. 1 shows a schematic view of a cross section of a portion of a film-cooled part having a film-cooling hole.

FIG. 1 schematically shows a part 10 cooled by a fluid coolant passing through an interior 12 of the part. The fluid coolant may be atmospheric air or another fluid having known thermodynamic properties such as nitrogen. Some of the coolant passes through film-cooling hole 20 along path 22 to an exterior 14 of part 10. Part 10 may have hundreds of such film cooling holes, though only one is shown here for purposes of illustration.

The temperature at various locations on the exterior surface of part 10 can be measured using infrared detector 30. Infrared detector 30 may be, for example, an imaging infrared radiometer or the like sensitive to electromagnetic radiation of a preselected wavelength. For example, a wavelength of about 9 to about 12 microns is suitable for a surface having a typical ceramic thermal barrier coating, such as yttria-stabilized zirconia oxide coating as is used on gas turbine high pressure, hot section parts. This wavelength range is used in this example because the coating is known to have an essentially constant emissivity of nearly 1 under test temperatures. In practice, any wavelength value or range may be used for any material as long as the calibration is done consistently, but one would need to deal with possible issues of signal strength or sensitivity to other factors. If the emissivity is unknown, then an additional step to determine this value must be added.

The temperature detected at any particular point along the surface of part 10 as it is being cooled will be influenced by a number of factors. First, heat is conducted through the internal surface 13 of part 10 where it is absorbed by coolant within the part. Second, coolant exiting hole 20 along path 22 generates a large heat transfer between the coolant and the inside walls of hole 20, generating a localized cooled zone in the immediate vicinity of hole 20. Note that this creates a heat sink locally which then conductively removes more heat from surrounding material. Third, there is a cloud 18 of film discharged on the exterior of part 10 that can serve to cool the part. It will be understood that these heat transfer effects are described for the case where the part is at a higher temperature than the fluid coolant, and that similar effects will occur when the coolant is at a higher temperature than the part, except that the heat will be transferred into the part instead of out of the part.

In practice, the flow rate through a film hole will induce a total material field thermal response when the fluid is at a different temperature than that of the material. In the present methodology, this becomes a transient thermal response when, for example, a cooler fluid such as air is flowed through the component and the film holes. The material around the film hole is then cooled from the initial temperature of the part to the coolant temperature over a period of time. The material thermal transient data, and specifically the external surface temperatures as a function of time are used herein to deduce the flow rate through each film hole.

The relationship of the flow rate to this thermal transient is of the form:

Film hole flow rate=$f$ (internal film hole heat transfer coefficient, internal component surface heat transfer component, external surface component heat transfer coefficient)

In the present method, the external convective heat transfer coefficient is not present, or is negligible since there is little or no external component flow during the test. Hence we are left with:

Film hole flow rate=$f$ (internal film hole heat transfer coefficient internal component surface heat transfer coefficient)

Three regimes of solution are possible in this situation (HTC means heat transfer coefficient here):

1. Hole HTC >> Internal surface HTC
2. Hole HTC << Internal surface HTC
3. Hole HTC = Internal surface HTC Case 1 is the majority for virtually all components such as turbine airfoils. Case 2 essentially never happens unless the film hole is severely blocked, in which case the thermal response will show an obvious flaw in the part. Under such circumstances, it would not be necessary to measure the film hole flow rate. Case 3 can occur under some conditions, but the surface area contained within the film hole dictates that the actual heat flux due to the film hole heat transfer will still be much more than that due to the interior part surface near the film hole, so the method still is valid.

Aside from the boundary conditions noted above, several geometric and fabrication factors may also affect film hole flow rate:

Film hole flow rate=$g$ (hole size or diameter, hole spacing, hole angle, hole shape, hole surface condition, etc.)

In theory and in practice, every differing combination of these parameters in an actual film hole will cause a different thermal response from that film hole. While the combinations are infinite, the practical applied combinations, fortunately, are not. Therefore, each film hole type may be characterized for its response, and each flow rate may be characterized yielding:

Film hole flow rate=$h$ (transient thermal response characteristic)

The disclosed method therefore requires that the transient thermal response be characterized mathematically, and that this mathematical characterization then be used to determine the film hole flow rate. Thus, the measured thermal response characteristic is correlated to a calibrated film hole flow rate response.

The calibration factor is determined empirically. Alternatively, numerical predictions, such as by computational fluid dynamics and/or finite element analyses, could be used in place of or in combination with experimental data to determine the thermal transient response calibration without experimentation. In practice, the numerical method would be calibrated with experimental data, but this may require far fewer test points than would be necessary to develop calibration factors derived entirely from experimental data. Note that the term, "calibration factor" is used loosely herein to refer to a relation between the transient thermal response characteristic and film hole flow rate; this relation may in fact be a non-linear function.

PRACTICAL EXAMPLE

A generic turbine airfoil model was created with three different rows of film holes. All holes had a diameter D of 0.030 inches (0.76 mm), and an angle to the surface tangent of 40-degrees. The rows of holes had hole-to-hole centerline spacings of 2D, 4D, and 6D, respectively. All holes were machined by the same process; all holes were round. The airfoil was such that the internal surface heat transfer coefficient was negligible, and there was no external flow or external heat transfer coefficient. In this example then, film hole flow rate becomes a function of hole spacing to be determined from the thermal response characteristic.

Figure 2:
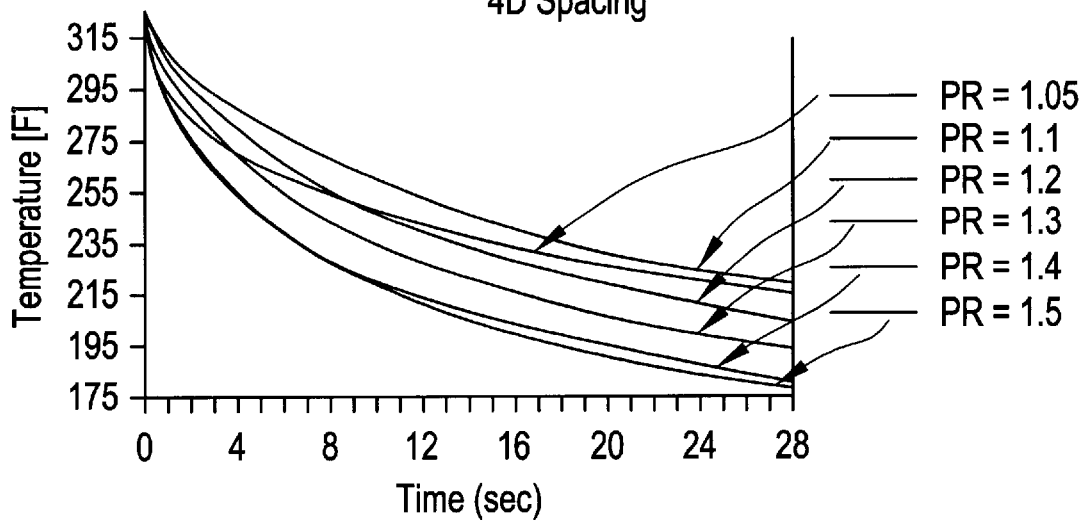
FIG. 2 shows a set of transient thermal response curves obtained from an exemplary film cooled part.

All holes were flowed at the same pressure ratio conditions of 1.05, 1.1, 1.2, 1.3, 1.4, and 1.5, hence all holes were tested in thermal transients using the same six flow rate conditions. The temperature time response of the 4D spacing film hole is shown in FIG. 2 as a function of pressure ratio.

Because tests cannot be precisely run to match initial temperatures and coolant temperatures, the temperature response of each curve is non-dimensionalized as Transformed Temperature =

Figure 3:
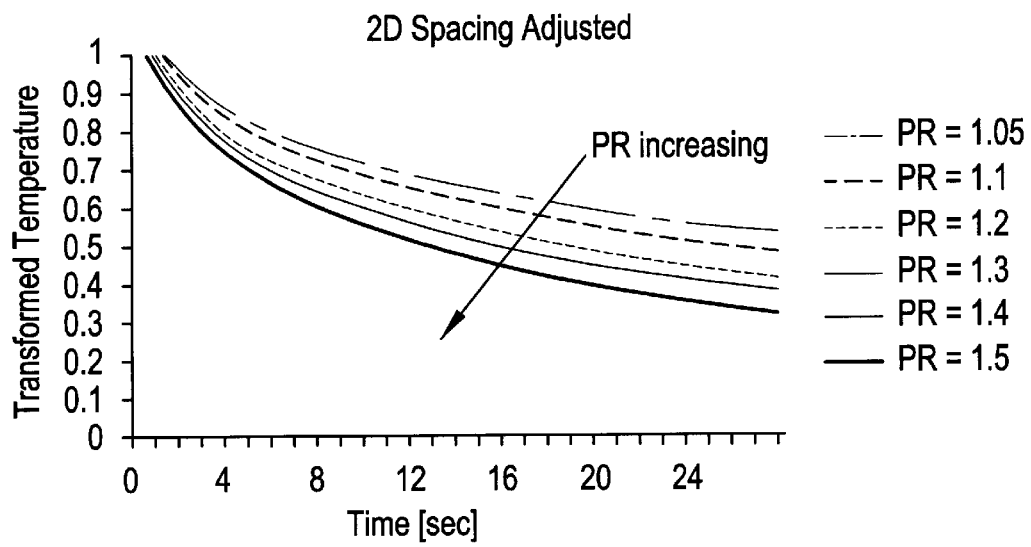
FIG. 3 shows the set of transient thermal response curves of FIG. 2 normalized for initial starting temperature.
Figure 4:
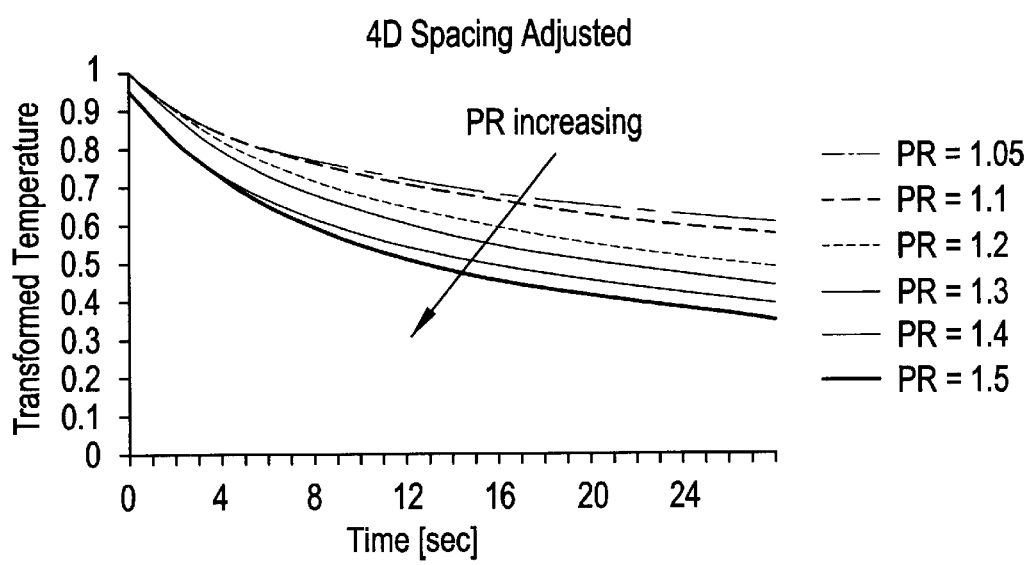
FIG. 4 shows another set of normalized transient thermal response curves of an exemplary film cooled part.
Figure 5:
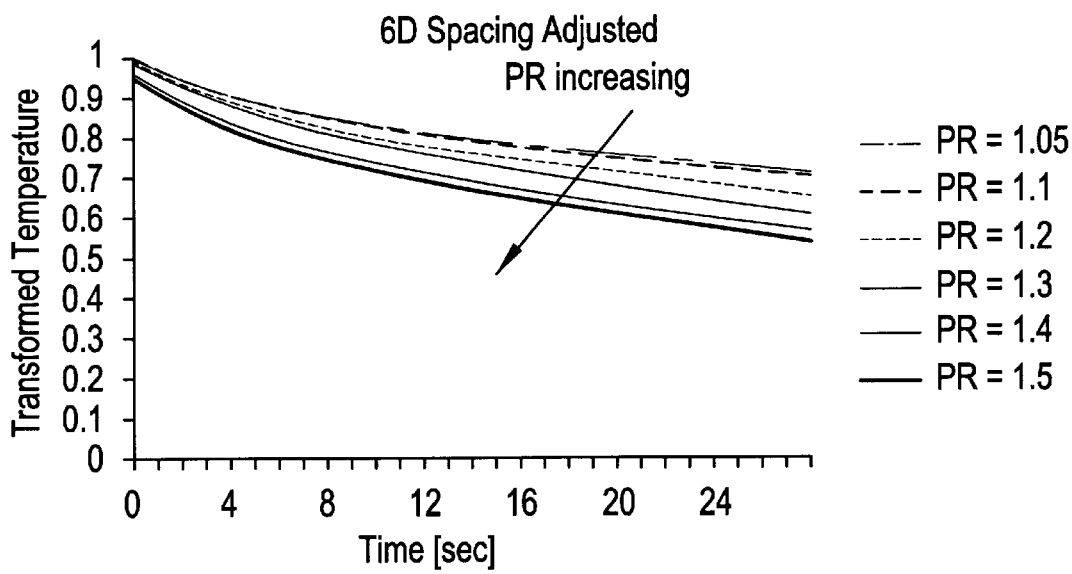
FIG. 5 shows yet another set of normalized transient thermal response curves of an exemplary film cooled part.

$(\text{surface } T \text{ } (time) - T \text{ } coolant)/(T \text{ } initial - T \text{ } coolant)|$ This transformation serves to normalize all curves to a common basis. The non-dimensional transformed temperature has values from 1 to 0. While the above transformation is preferred, other transformations are known which are also applicable. Also note that "T initial" need not be literally at time zero, but can be any appropriate initial temperature within the transient. FIGS. 3–5 show the transformed data for hole spacings of 2D, 4D, and 6D. These responses are physically consistent in that higher flow rates (pressure ratios) result in faster thermal decay rates, and closer hole spacings also result in faster decay rates. In each of these sets of results, one point on the surface is presented, that which is between two adjacent holes and offset a distance of 2D from the film hole row.

Figure 6:
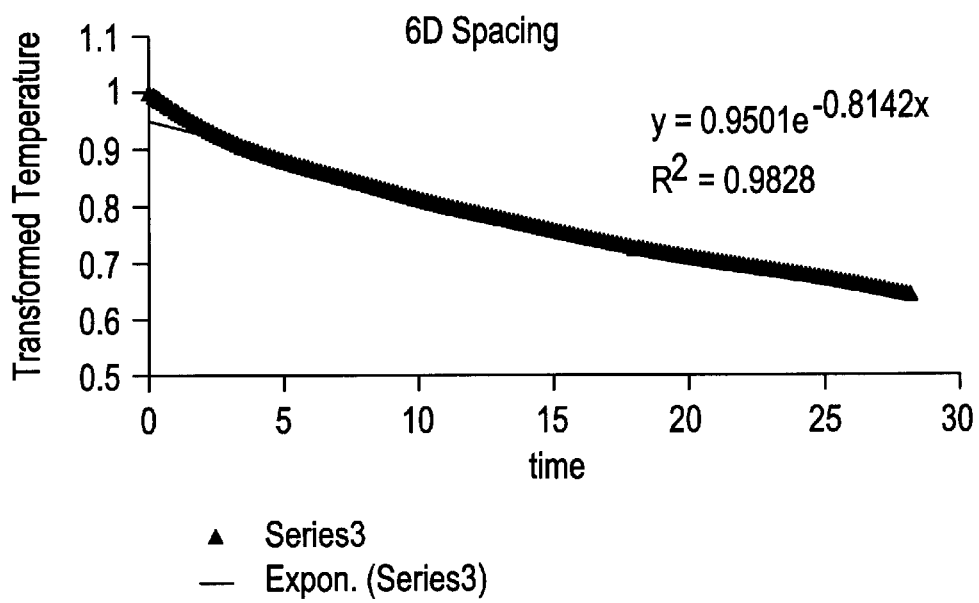
FIG. 6 shows an exemplary curve fit for a normalized transient thermal response curve.
Figure 7:
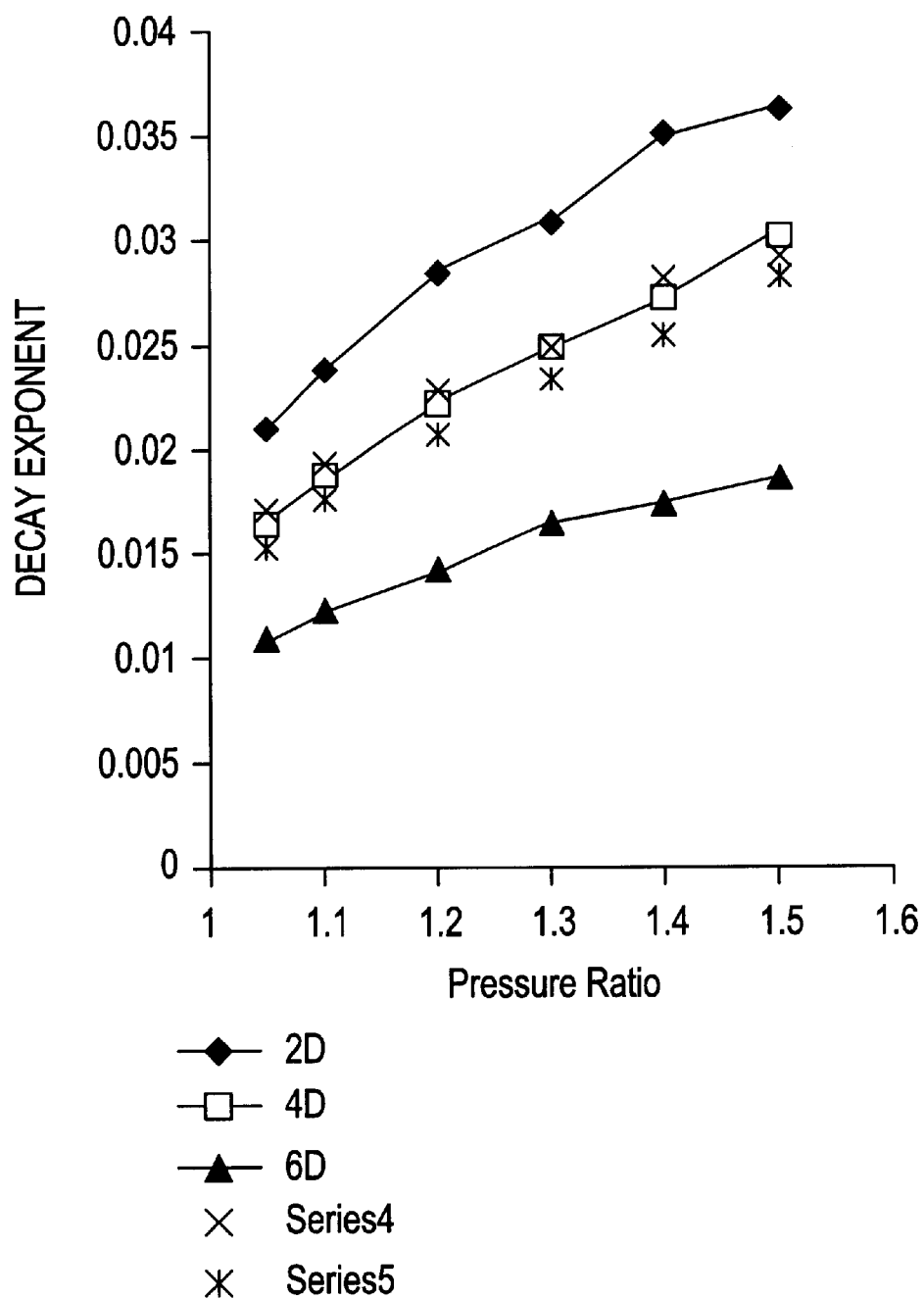
FIG. 7 shows a set of decay exponents relative to various curve its of exemplary normalized transient thermal response curves.

From this thermal decay data, each curve may be fitted with one of several functional forms. FIG. 6 shows perhaps the simplest format in which an exponential curve fit has been used resulting in the characterization of each curve by a thermal decay rate coefficient as Transformed Temperature=$A \text{ } e^{-Bt}$ where A is the ordinate intercept and B is the thermal decay rate coefficient. The coefficient B characterizes the behavior of each film hole type at each flow fate. In the example of FIG. 6, B=0.0142. FIG. 7 shows the resulting thermal decay coefficients for all conditions tested. It is clear from this result that each hole spacing may be characterized well by this decay coefficient, and furthermore that a relationship may be established between the curves. The "series 4" and "series 5" points are the result of a data regression in the form $B \text{ (spacing 2)}=B \text{ (spacing)}*SD \text{ (spacing 2)}^{0.3}$ where SD is the spacing increase in going from spacing 1 to spacing 2. This is merely one of several possible regression formats which serves to collapse the thermal response characteristics into a more manageable or concise format.

The result of this example shows that a calibration may be obtained by testing various film holes and flow rates, such that the thermal transient rate may be characterized in terms of a simple parameter or set of parameters (coefficients). This calibration may then be used in conjunction with actual component thermal transient test data to quantify the individual film hole flow rates for the part.

It should be noted that fitting an exponential form to the thermal decay data is one of many options. Polynomials, log forms, etc. may also be used. In addition, the precise location of the surface temperature-time history on the component near a film hole is arbitrary. Test data shows that any location around the film hole may yield similar results. Consistency in selecting the data location, however, is desired to reduce errors from one film hole to another, or from part to part.

Another embodiment of the disclosed method will now be described with reference to FIGS. 1 and 8. In this embodiment, the flow of coolant is temporarily halted during the transient response, thereby generating a certain amount of thermal recovery at the surface as the large thermal gradients within part 10 in the immediate vicinity of hole 20 dissipate.

Figure 8:
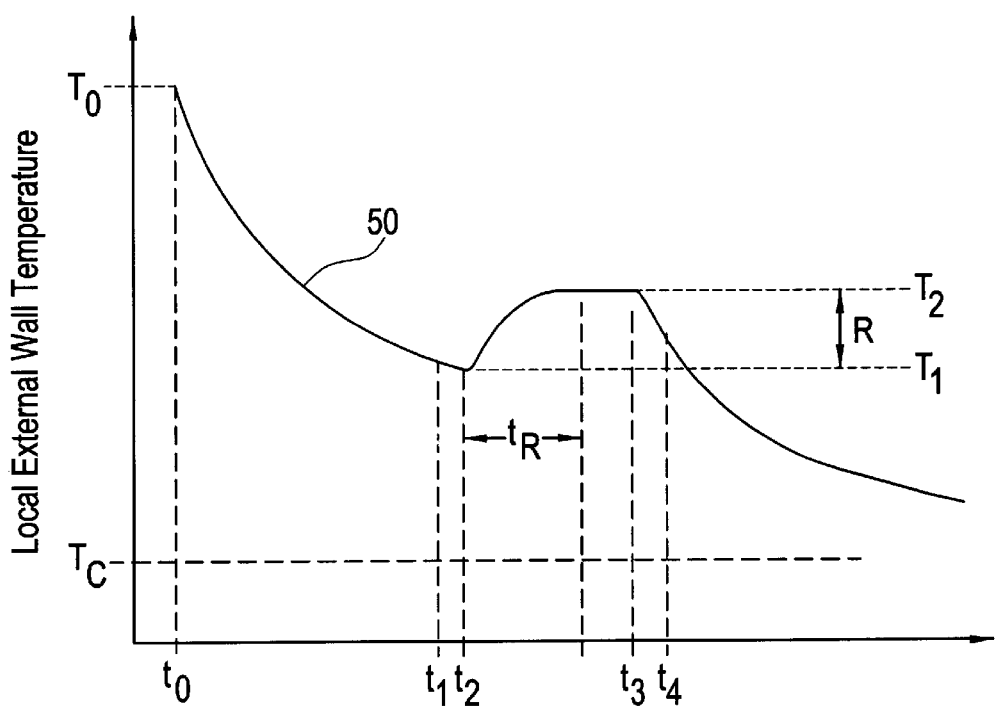
FIG. 8 shows an exemplary transient thermal response for a part subjected to interrupted cooling.

Referring then to FIG. 8, an exemplary time-temperature graph showing the thermal response of the surface temperature of part 10 near hole 20 is shown by curve 50. At time $t_0$, part 10 is being cooled and its temperature drops along a typical response curve showing a monotonic decaying response to time $t_2$, whereat the measured temperature is $T_1$ and the flow of coolant is halted until time $t_3$. At time $t_3$, the measured temperature is $T_2$ and the flow of coolant is resumed and curve 50 continues along a new monotonic response curve. The interval between $t_0$ and $t_2$ and between $t_2$ and $t_3$ may be preselected based on experimentation. Alternatively, the time $t_2$ may vary and may be equal to the time it takes for the temperature to change a selected percentage of the difference between the coolant temperature $T_C$ and initial temperature $T_0$ of part 10, e.g., when temperature $T=T_0-(T_0-T_C)/2$. Time $t_3$ may be based on a specified time interval from $t_2$, or it may be based on characteristic change in temperature leading up to $t_3$. Preferably, time $t_3$ is selected such that the recovery magnitude R is about one order of magnitude (10×) greater than the error or accuracy associated with the temperature measurements. This allows for differing measurement accuracy for various applications. Lesser values could also be acceptable if lesser accuracy in the results is acceptable. Time $t_3$ may alternatively be designated as the time it takes for the slope of curve 50, defined by the $dT/dt|_{t_3}$ to reach a threshold minimum.

Once the transient response curve 50 is obtained for a location adjacent hole 20, the flow rate is determinable from a mathematical characterization of curve 50, e.g., from the relative locations of specific points on curve 50. For example, the flow rate through hole 20 may be determined as a function of the magnitude of recovery R, which is the difference between $T_2$ and $T_1$. Alternatively, the flow rate may be determined from the length of recovery time $t_R$. In addition, the difference in slopes m of curve 50 at times $t_1$ and $t_4$ are related to film hole cooling rate. The relation between recover R, recover time $t_R$, or difference in slopes $\Delta m_R$ and the flow rate through hole 20 is determined empirically, through numerical analysis, or a combination thereof as discussed above. Times $t_1$ and $t_4$ are a predetermined distance from times $t_2$ and $t_3$ respectively, e.g., several seconds, so that slopes at corresponding points 54 and 60 reliably vary with the flow rate. Note that the amount of recovery R and the recovery time $t_R$ do not rely on restarting the coolant and so the step of restarting the coolant flow can be eliminated when using these methods of characterization. Also, multiple measures of the flow rate can be made using these various techniques to improve accuracy or as a check against errors.

This technique for measuring film hole flow rates can be calibrated for film hole types and materials on a test bench, and thus the calibration may be done once for all parts and all uses. Individual film hole inspection and flow rate measurement can be made. The technique is not restricted to metallic parts. The part can also be of another material, or a multi-layered material and/or composites, such as a turbine airfoil having ceramic coating over the base metal. This simply means a new calibration data set for the new material or layered/composite material. Inspection of pre-service and post-service parts can be made.

While the technique described above has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for measuring a flow rate in a cooling hole of a film cooled part, the method comprising:
   measuring a transient thermal response of an external surface temperature of said film cooled part resulting from a flow of fluid through said part, said fluid having an initial temperature that is different from an initial temperature of said film cooled part;
   mathematically characterizing said transient thermal response;
   determining said flow rate from said characterization.

2. The method of claim 1 wherein said measuring includes using infrared imagery.

3. The method of claim 1 wherein said measuring includes measuring a point on said external surface near said cooling hole.

4. The method of claim 1 wherein said mathematically characterizing includes fitting an exponential curve to measurements generated from said measuring a transient thermal response.

5. The method of claim 4 wherein said exponential curve has the form $Ae^{-Bt}$, where the coefficient B correlates to said flow rate.

6. The method of claim 1 wherein said determining comprises applying a calibration factor to said mathematical characterization to obtain said flow rate.

7. The method of claim 1 wherein said fluid is colder than said initial temperature of said part.

8. The method of claim 1 wherein said fluid is atmospheric air.

9. The method of claim 1 wherein said measuring further comprises:
   halting said flow of fluid;
   measuring a surface temperature of said part at or prior to said halting and
   measuring said surface temperature after said halting.

10. The method of claim 9 wherein said characterization comprises a difference between said measurements of said surface temperature.

11. The method of claim 9 wherein said step of measuring includes measuring a transient thermal response of said surface temperature after halting said flow of coolant to obtain a recovery time, said recover time being an amount of time that it takes for temperature gradients around said one of said holes to dissipate, wherein said flow rate is determined as a function of said recovery time.

12. The method of claim 11 wherein said temperature gradients are determined to be dissipated when a rate of change of said surface temperature reaches a threshold.

13. The method of claim 9 further comprising restarting said flow of said fluid, said mathematically characterizing includes determining a first rate of change of said temperature prior to said halting and a second rate of change of said temperature after said restarting, wherein said flow rate is determined as a function of a difference of said first and second rates of change of said temperature.

14. The method of claim 9 further comprising restarting said flow of said fluid, said mathematically characterizing includes determining a first rate of change of said surface temperature prior to said halting and a second rate of change of said temperature after said restarting; said determining comprises determining a flow rate from a least one of a recovery amount, a recovery time, and a difference in said first and second rates of change of said surface temperature.

15. The method of claim 9 wherein said halting occurs at a predetermined time after starting said supplying.

16. The method of claim 9 wherein said halting occurs when said surface temperature changes a selected percentage of a difference between said temperature of said coolant and said initial temperature of said part.

* * * * *